United States Patent [19]

Mann et al.

[11] Patent Number: 4,581,949
[45] Date of Patent: Apr. 15, 1986

[54] HYDROSTATIC/MECHANICAL TRANSMISSION SYSTEM

[75] Inventors: Egon Mann; Ünal Gazyakan, both of Friedrichshafen, Fed. Rep. of Germany

[73] Assignee: Zahnradfabrik Friedrichshafen AG, Fed. Rep. of Germany

[21] Appl. No.: 649,128

[22] Filed: Sep. 10, 1984

[30] Foreign Application Priority Data

Sep. 15, 1983 [EP] European Pat. Off. ...... EP83/00242

[51] Int. Cl.⁴ ................... B60K 25/08; B60K 25/02; F16H 37/00
[52] U.S. Cl. ................... 74/15.4; 180/53.2; 74/15.8
[58] Field of Search ............ 74/15.4, 15.6, 15.66, 74/15.8, 15.86, 15.63, 15.69, 15.82, 15.84, 15.88; 417/231; 180/53.2, 53.4, 53.8

[56] References Cited

U.S. PATENT DOCUMENTS

| 3,241,628 | 3/1966 | Thomas | 180/53.4 |
| 3,597,998 | 8/1971 | Ebert | 74/15.66 |
| 3,779,608 | 12/1973 | Hatcher et al. | 180/53.2 |
| 3,922,931 | 12/1975 | Osujyo et al. | 74/15.2 |
| 4,132,132 | 1/1979 | Shaffer | 74/15.86 |
| 4,271,723 | 6/1981 | Shaffer | 180/53.2 |
| 4,416,590 | 11/1983 | Colucci | 417/231 |

FOREIGN PATENT DOCUMENTS 2808437 8/1979 Fed. Rep. of Germany .
1278223 6/1972 United Kingdom .

Primary Examiner—Lawrence J. Staab
Assistant Examiner—Michael D. Bednarek
Attorney, Agent, or Firm—Hayes, Davis & Soloway

[57] ABSTRACT

A multi-speed transmission (4) driven by an engine (1) and is connected to drive an intermediate gearbox (16) that drives an axle drive (17). To obtain creep speed drive, a motor-dependent P.T.O. shaft (14) drives upon a variable displacement pump (18), which is connectable to a hydromotor (22) through pipes (20, 20A and 21, 21A). When the clutch (26) is connected and in the neutral position of the variable gear (2), the hydromotor (22) acts upon an output shaft of intermediate gear box (15) that in turn drives the axle drive (17). When changing to a garbage pressing operation in the stationary state of the vehicle, the variable displacement pump (18) is shifted by a change-over valve (28) to drive the pressing cylinder of the accessory hydraulic power system (30).

7 Claims, 3 Drawing Figures

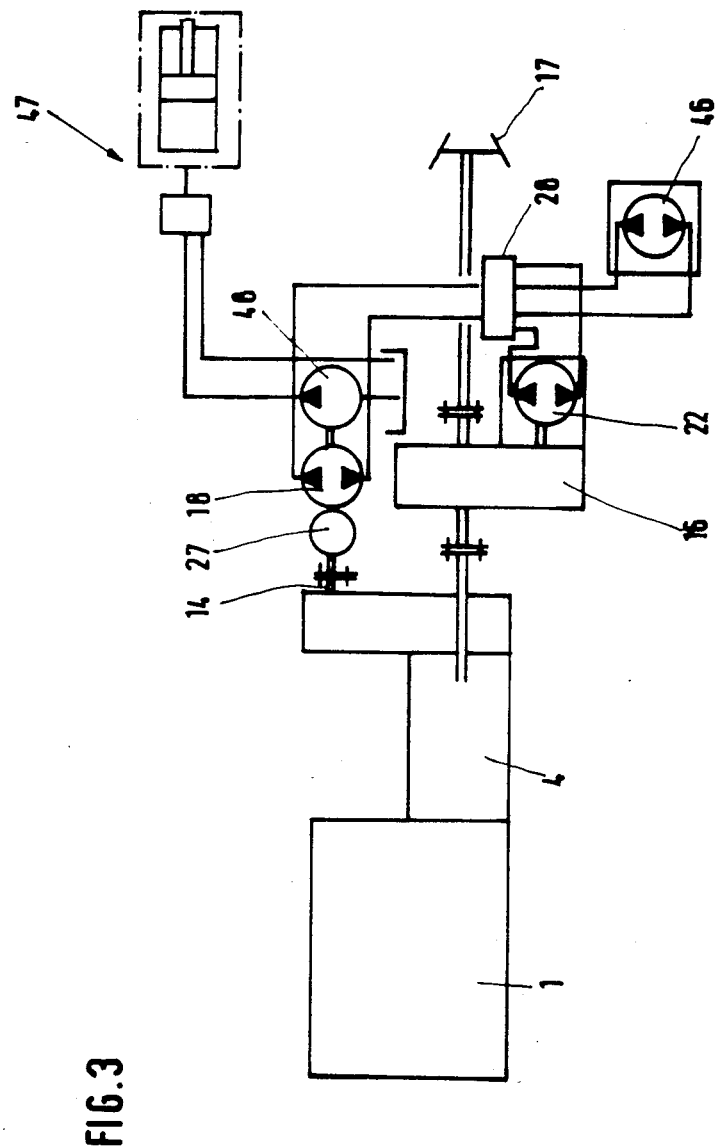

HYDROSTATIC/MECHANICAL TRANSMISSION SYSTEM

The invention concerns itself with a hydrostatic/mechanical transmission system, especially, though not exclusively, for garbage-collection vehicles.

In garbage collection vehicles the transmission and accessory hydraulic power system preferably provides the following:

creep speed travel at the beginning of operation, especially "stop-and-go operation", for which a hydrostatic transmission is engaged;

for loading, the hydrostatic transmission is disconnected and the vehicle stopped while simultaneously there is engaged an accessory hydraulic power system, which draws out the garbage from a loading furnace and compacts it, for instance, by the interaction of a pressure plate movable by working cylinders and of a sliding wall (so-called pressing operation or also garbage operation); and normal road travel using a conventional multi-speed mechanical transmission.

British Pat. No. 12 78 223 discloses a transmission system including a engine coupled through a shifting clutch; an accessory motor-dependent power take-off driving a variable displacement pump, which is hydraulically connected with a hydromotor for creep speed operation; said variable displacement pump acting upon said hydromotor in a closed circuit; and an accessory hydraulic power system for driving working units. An engine is here connected by an intermediate gearbox with a multispeed transmission that drives a driving axle. A motor-dependent variable displacement pump drives through a hydraulic circuit a hydromotor, which can be connected to the traveling gear via the intermediate gearbox. In this arrangement, together with the normal drive, a hydrostatic creep speed drive is only possible via the normal travel transmission using the speed steps of the multispeed transmission. The multispeed transmission has, in addition, a power take-off shaft for driving a constant displacement pump connected to a hydromotor for the accessory hydraulic power system.

Therefore, the known transmission system works with a route-depending power take-off shaft and with separate oil circuits for the travel mechanism and the accessory hydraulic power system. The special requirements stated at the beginning for garbage collection vehicles, namely, actuation of pressure plate and sliding wall in the stationary state of the vehicle, cannot be met with this structure.

DE-OS No. 28 98 437, for instance, has disclosed a transmission system that shows, coupled with the engine, a variable gear which actuates one or more driving axles across a distributor gear. In addition, there is connected to the engine a switchable accessory drive which can drive several hydromotors across a pump distributor gear. One of these pumps is hydraulically in communication with one hydromotor, which drives the variable gear across the stepdown gear. In this transmission, by making allowances for a higher switching action, the variable gear can be used for hydrostatic creep speed travel. In this mode, the vehicle must be stopped to make each gear shift. Such a system makes necessary, in addition to the main clutch, another clutch, which, when the hydrostatic drive is engaged, makes possible a division of the main drive between the engine and the variable gear.

The present invention is based on the problem of finding a driving system for the travel and garbage pressing operations that is adapted to the special uses of garbage collection vehicles.

According to the invention, a variable displacement pump is connected to a hydromotor of a creep travel mechanism when in the creep speed travel and, in the stationary state of the vehicle, is connected by a changeover valve to an accessory hydraulic power system of a pressing system. The hydromotor in creep speed travel is operated in a closed oil circuit while the accessory hydraulic power system is operated with oil under pressure in an open hydraulic circuit. The invention makes it possible to supply the vehicle drive transmission and the accessory hydraulic power system with only one hydromotor. In the "garbage pressing operation" the variable displacement pump is advantageously adjusted to a specific delivery and the engine is, at the same time, set to a constant speed, for instance, by the regulator of its injection pump. Thus, the motor-dependent accessory power take-off that drives the variable displacement pump is subjected to no variations of speed.

Another advantage of the invention consists in that the hydromotor for the creep speed drive is connected with an output shaft of intermediate gearbox permanently connected to the secondary gear shaft so that the creep speed drive can be introduced only on the neutral position of the variable gear.

The invention will now be described, by way of example, with reference to the accompanying drawings, in which:

FIG. 3 is a second (simplified) embodiment of a transmission system according to the invention.

Figure 1:
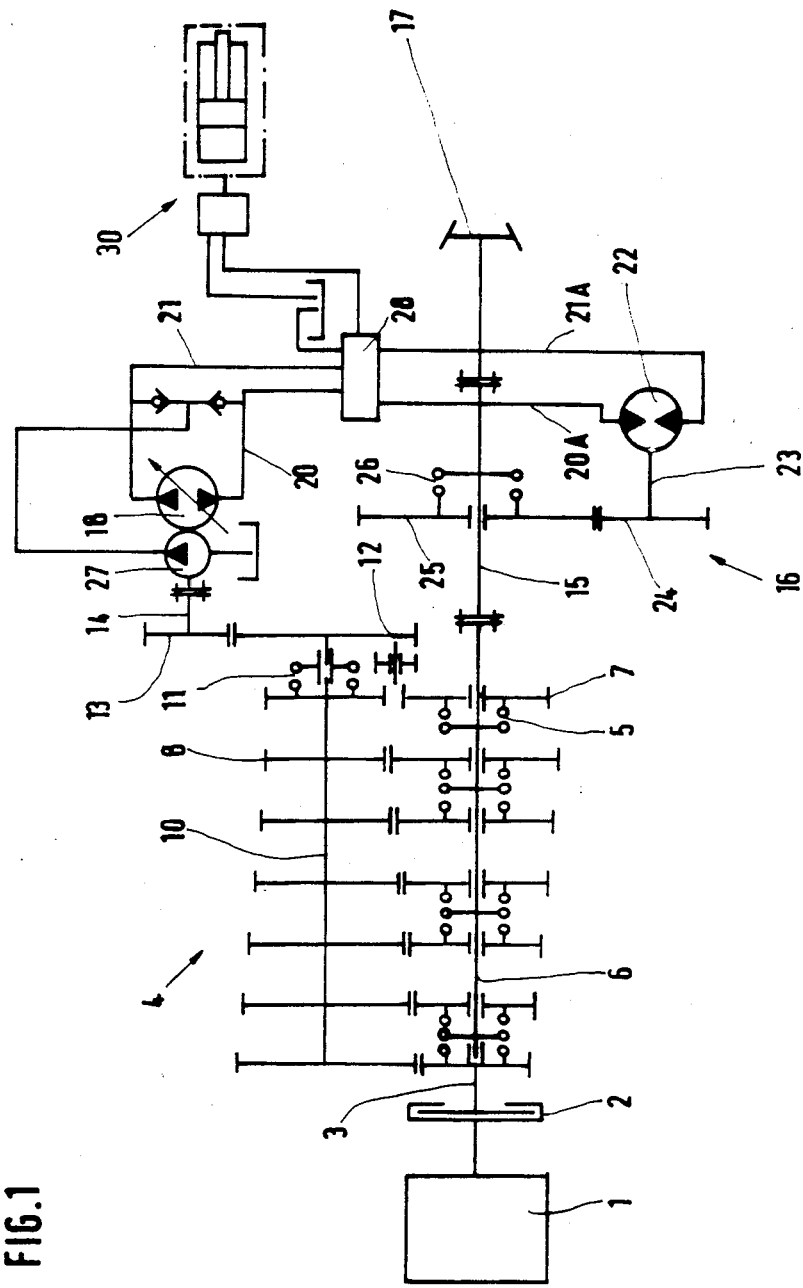
FIG. 1 is a diagrammatic structure of a first embodiment of a transmission system according to the invention.

Reference numerals in the drawings represent components, as follows:

| 1 | Engine | 26 | Clutch |
|---|---|---|---|
| 2 | Main clutch | 27 | Charge pump |
| 3 | Primary gear shaft | 28 | Change over valve |
| 4 | Variable gear | 30 | Accessory hydraulic power system |
| 5 | Shifting clutch | | |
| 6 | Secondary gear shaft | 31 | Control unit |
| 7 | Idler gear | 32 | Electrical line (input) |
| 8 | Fixed gear | 33 | Electrical line (output) |
| 10 | Countershaft | 35 | Direction shaft valve |
| 11 | Clutch | 36 | Direction shaft valve |
| 12 | Gear | 37 | Pipe |
| 13 | Gear | 38 | Check valve |
| 14 | P.T.O. shaft | 40 | Check valve |
| 15 | Output shaft | 41 | Pressure relief valve |
| 16 | Intermediate gearbox | 42 | Pipe |
| 17 | Axle drive | 43 | Preselector valve |
| 18 | Variable displacement pump | 44 | Safety valve |
| 20 | Pipe | 45 | Safety valve |
| 20A | Pipe | 46 | Hydromoter |
| 21 | Pipe | 47 | Accessory hydraulic power system |
| 21A | Pipe | 48 | Hydromotor |
| 22 | Hydromotor | | |
| 23 | Primary shaft of intermediate gearbox | | |
| 24 | Gear | | |

| 25 | Idler Gear |
|---|---|

According to FIG. 1 an engine 1 drives, via a main clutch 2 and a primary gear shaft 3, for instance, a six ratio constant mesh mechanical transmission of conventional construction. Shifting clutches, such as 5, are constrained to rotate with but are movable longitudinally on a secondary gear shaft 6 and can be engaged to couple the idler gears, such as 7, with the secondary gear shaft 6. The idler gears are meshed with fixed gears, such as 8, on a countershaft 10. The mode of operation of a multi-step transmission of this kind is known. The countershaft 10 can be connected with a power-take-off shaft 14 across a meshed gear pair 12, 13 by a clutch 11.

The secondary gear shaft 6 is connected to an output shaft 15 of an intermediate gearbox 16. The output shaft 15 of intermediate gearbox 15 leads to an axle drive 17. The creep speed drive takes place via a variable displacement pump 18 actuatable by the P.T.O. shaft 14, said variable displacement pump in turn driving a hydromotor 22 by way of pines 20, 21, 20A, 21A. The hydromotor 22 is connected with a primary shaft 23 of intermediate gearbox 16 on which is secured a gear 24. This gear 24 is engaged with an idler gear 25. The idler gear 25 can be coupled by a clutch 26 with the output shaft 15 of the intermediate gearbox.

The variable displacement pump 18 and the hydromotor 22 for the creep speed are in the closed hydraulic circuit. There is also provided a hydraulic charge pump 27 likewise driven by the P.T.O. shaft 14. This charge pump 27 maintains in a manner known per se oil capacity required in the pipes 20, 20A, 21, 21A when the vehicle travels in the hydrostatic creep speed drive. Between the pipes 20, 20A and 21, 21A there is interposed a change-over valve 28 that can switch the variable displacement pump 18 to drive an accessory hydraulic power system instead of the motor 22.

Figure 2:
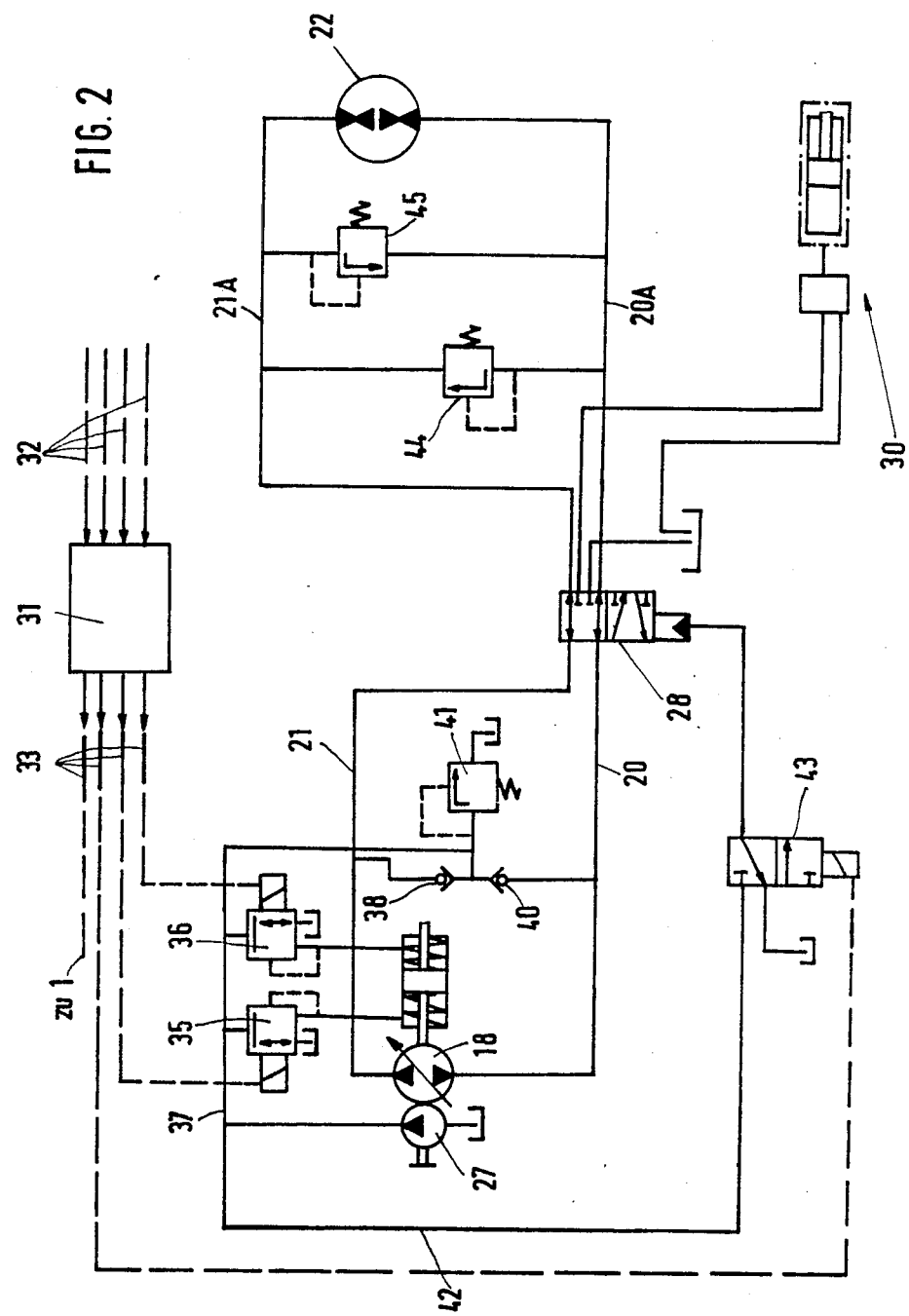
FIG. 2 is the hydraulic diagram of the transmission system according to FIG. 1.

The hydraulic diagram according to FIG. 2 shows that different operating conditions can be produced by electric control signals controlled by an electronic control unit 31. It is thus possible, across electrical lines 32 in the control unit, to give to the control unit input signals such as of the respective gas pedal position and engine speed, the same as of the position of a commutator switch and of a creep speed switch of an accessory hydraulic power system. Across the electrical lines 33 the produced output signals of the engine 1 (n=constant in the control of the accessory hydraulic power system) are fed to a preselector valve 43 and two direction shaft valves 35, 36 for forward and reverse travel. The pumping direction of the variable displacement pump 18 for changing the driving direction is reversible via the direction shaft valves 35 and 36. The charge pump 27 is connected by a pipe 37 and check valves 38, 40 with the pipes 20 and 21 of the variable displacement pump 18, that is, the charge pump 27 maintains filled in the position of the change-over valve 28 shown in FIG. 2 the closed oil circuit consisting of the variable displacement pump 18, the hydromotor 22, and the pipes 21, 21A, 20, 20A. A pressure relief valve 41 protects the charge pump 27 against overloading. In addition to the direction shaft valves 35, 36 for the change in travel direction, the charge pump 27 supplies via another pipe 42 the preselector valve 43. The pipes 21A, 20A that lead to the hydromotor 22 contain safety valves 44, 45.

To control the transmission system, the driver uses, together with a conventional gear shift lever, a preselector lever with the positions "normal travel" or "additional drive" and another shift lever with the positions "creep speed travel" or "garbage operation".

In the normal travel, the preselector lever is in the "normal travel" position multi-speed transmission 4 being in operation in the customary manner. At the same time the P.T.O. shaft is disconnected by the clutch 11 (FIG. 1). The clutch 26 of the intermediate gearbox 17 is likewise disengaged. The secondary gear shaft 6 thus drives the axle drive via the output shaft of intermediate gearbox 15.

If the vehicle is to be used in the garbage collecting operation, the preselector lever must be set at "additional drive" and the shift lever at "creep speed travel". At the same time an adequate inter-locking means ensures that the adjustment of the shift lever to "creep speed travel" is possible only in the neutral position of the multi-speed transmission. In the "creep speed travel" position the clutch 26 and the clutch 11 are engaged. The variable displacement pump 18 is driven to drive the hydromotor 22 when the change-over valve 28 is in the position shown in FIG. 2. The energy here flows to the axle drive 17 across the primary shaft of intermediate gearbox 23, the gears 24 and 25, and the output shaft 15 of intermediate gearbox. By means of a speed- and load-dependent control of the variable displacement pump 18, the velocity can be regulated within a range of from 0 to 40 km/h.

When the vehicle has reached the garbage container to be emptied, the driver changes, only with the shift lever, from "creep speed travel" to "garbage operation" (pressing operation). This change produces in the control unit 31 an output signal as a result of which the preselector valve 43 (as seen in FIG. 2) shifts upwardly. The pressure of the charge pump 27 predominating in the pipe 42 now acts upon the change-over valve 28 that likewise shifts upwardly (as seen in FIG. 2). The variable displacement pump 18 thus acts through the open circuit upon the accessory hydraulic power system 30. In this position the engine 1 is automatically adjusted by the injection pump to provide a constant speed for the P.T.O. shaft 14. The variable displacement pump 18 likewise goes automatically to a desired delivery volume. The gas pedal is inoperative in the above mentioned position.

In the garbage collecting operation the driver, therefore, controls only one shift lever between the "creep speed travel" and the "garbage operation" positions, said shift lever acting upon the change-over valve 28 across the control unit 31 and alternatively engaging either the hydromotor 22 or the accessory hydraulic power system.

The brake pedal of the vehicle can advantageously be coupled with the variable displacement pump 18 in a manner such that the latter be driven as a motor. This produces a hydrostatic braking action.

The embodiment illustrated in FIG. 3 is suited to a garbage collecting vehicle having a rotary drum construction. The structural parts coinciding with those of FIGS. 1 and 2 are designated here with the same reference numerals. To drive the rotary drum, there is provided another hydromotor 46 that can be driven, in the corresponding position of the change-over valve 28, in a closed circuit by the variable displacement pump 18. Here the hydromotor 22 for the creep speed drive and the hydromotor 46 for the rotary drum (accessory hydraulic power system) are alternatively driven as described in relation to FIGS. 1 and 2. When the rotary drum drive is switched in, the variable displacement pump 18 is driven at constant speed. The delivery volume of the variable displacement pump 18 can be changed in this embodiment by a separate lever or by the gas pedal. In the case of adjustment by the gas pedal, for instance, via a potentiometer actuatable by the gas pedal, the latter must be disconnected from the engine. In this transmission system another accessory hydraulic power system is needed. Accordingly, there is provided an additional hydromotor 48 that can be driven by the P.T.O. shaft 14. The hydromotor 48 acts with a constant delivery volume upon the working cylinder, for instance, of a hoisting means for the garbage container. The variable displacement pump 18 and the hydromotor 48 are advantageously designed as tandem pumps.

We claim:

1. A hydrostatic mechanical transmission system, especially for garbage collection vehicles, comprising:
   an engine being coupled by a clutch (2) to a mechanical transmission (4) and a secondary gear shaft;
   said mechanical transmission (4) being further coupled to an accessory motor-dependent power take-off, for creep speed drive, said motor-dependent power take-off drives a variable displacement pump (18) which is connected hydraulically in a closed fluid circuit with a hydromotor (22); and
   an accessory hydraulic power system (30) for driving working units, characterized in that said variable displacement pump (18) being connected by way of a change-over valve (28) with both said hydromotor (22), for the creep speed drive, and with said accessory hydraulic power system (30), but supplying fluid power to only one unit at a time.

2. A hydrostatic mechanical transmission system according to claim 1, characterized in that said hydromotor (22) being connected, via an intermediate gearbox (16), with the secondary gear shaft (6); said hydromotor (22) being connectable only while the mechanical transmission is in a neutral position.

3. A hydrostatic mechanical transmission system according to claim 1, characterized in that when a shift lever is actuated for said accessory hydraulic power system ("garbage operation"), said change-over valve (28) shifts to and powers said accessory hydraulic power system (30).

4. A hydrostatic mechanical transmission system according to claim 1, characterized in that in switching to said accessory hydraulic power system (30), said variable displacement pump (18) is adjusted to deliver a certain fluid volume.

5. A hydrostatic mechanical transmission system according to claim 1, characterized in that said engine (1) is automatically adjusted to a constant speed when said accessory hydraulic power system (30) is activated.

6. A hydrostatic mechanical transmission system according to claim 1, characterized in that when the creep speed drive is activated, said variable displacement pump (18) being coupled with brake means to provide hydrostatic braking.

7. A hydrostatic mechanical transmission system according to claim 1, characterized in that said change-over valve (28) being able to switch from the closed circuit of the creep speed drive to an open circuit of said accessory hydraulic power system (30) (FIGS. 1 and 2).

* * * * *